United States Patent Office 3,585,246
Patented June 15, 1971

3,585,246
METHOD OF INITIATING AN OXYCHLORINATION REACTION
Raymond M. Vancamp, New Martinsville, W. Va., Gerald E. Duffy, Monroe, La., and Charles E. Drum, Woodsfield, Ohio, assignors to PPG Industries, Inc., Pittsburgh, Pa.
Continuation-in-part of application Ser. No. 516,342, Dec. 27, 1965. This application Sept. 5, 1968, Ser. No. 757,634
Int. Cl. C07c *21/10, 21/12, 17/02*
U.S. Cl. 260—654
7 Claims

ABSTRACT OF THE DISCLOSURE

A method of initiating oxychlorination reactions is described. The order of additions of the reactants for a fluidized bed oxychlorination reaction system and guidelines for adding the various materials are set forth. Specifically, the material to be chlorinated, the chlorinating agent and oxygen utilized to conduct the oxychlorination reaction are added to a fluidized bed of oxychlorination catalyst particles, the bed being fluidized initially by an inert gas and maintained at reaction temperature. Specific procedures for initiating reactions of 1,2-dichloroethane with elemental chlorine and oxygen to produce perchloroethylene and trichloroethylene and for producing 1,2-dichloroethane from ethylene are described. Various organic materials such as methane, ethane, ethyl chloride, 1,2 - dichloroethane, 1,1 - dichloroethane, ethylene, propane, propyl chloride, propene and butane are disclosed as typical feed materials to be oxychlorinated in accordance with the start-up procedures recited. In the procedure described the catalyst particles are first fluidized and maintained at reaction temperature for the oxychlorination which is to be conducted. Air is typically utilized for this purpose. The chlorinating agent is then fed to the reaction system while a reduction in the flow of air corresponding to the quantity of chlorinating agent fed is accomplished. The material to be chlorinated is then added to the bed to provide a mixture of chlorinating agent and the material to be chlorinated. When a rise in temperature of the reaction bed is observed, the addition of the oxygen to the fluidized bed begins. In this manner safety from pre-reactions, explosions and excessive burning is provided.

CROSS-REFERENCE TO RELATED APPLICATIONS

This application is a continuation-in-part application of application Ser. No. 516,342, filed Dec. 27, 1965 and now abandoned.

BACKGROUND OF THE INVENTION

In the oxychlorination of aliphatic hydrocarbons containing from 1 to 4 carbon atoms, particularly fluidized bed operations, considerable care must be taken during the start-up of these reactions in order to safely and efficiently cause the various gaseous components of the reaction system to react, to prevent explosive conditions from occurring especially in the vapor space above the fluidized bed in the reaction vessel itself, and to minimize undesirable side reactions.

In British patent specification 904,084, for example, a process is described for the production of chlorinated hydrocarbons in a fluidized bed of catalytic materials. The process described has particular applicability to the oxychlorination of aliphatic hydrocarbons containing from 1 to 4 carbon atoms and/or partially chlorinated aliphatic hydrocarbons containing 1 to 4 carbon atoms. These materials are reacted with a chlorinating agent selected from the group consisting of HCl, $Cl_2$ and mixtures of HCl and $Cl_2$, and oxygen. Special precautions are taken in this particular patent to introduce the oxygen at a lower level in the fluidized bed but at a level above the level at which the hydrocarbon and/or chlorinated hydrocarbon and the chlorinating agent are fed.

SUMMARY OF THE INVENTION

The present invention relates to the oxychlorination of aliphatic hydrocarbons containing from 1 to 4 carbon atoms and their incompletely chlorinated derivatives to produce hydrocarbon chlorides of the aliphatic hydrocarbon or a higher chlorinated derivative of the hydrocarbon chloride feed. More particularly, the present invention relates to improvements in the method of starting up oxychlorination reactions in order to avoid the excessive pressure build-up in reactors, hazardous explosions or the quenching of reactors during start-up.

BRIEF DESCRIPTION OF THE DRAWING

In the accompanying drawing.

DETAILED DESCRIPTION

Figure 3:
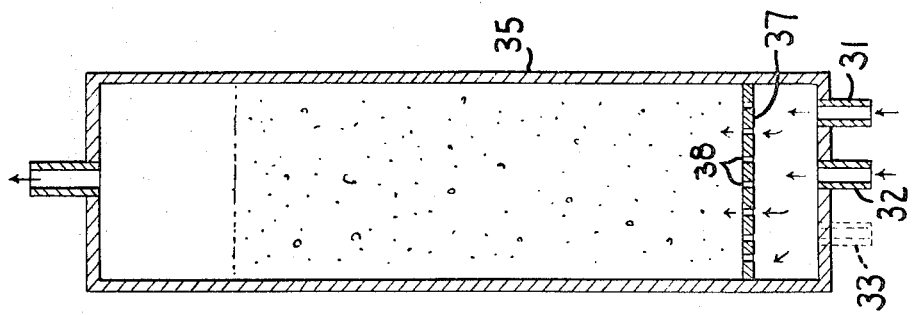
FIG. 3 represents a fluidized bed oxychlorination reaction system in which the reactants are fed at the same level in the bed.

The present invention is applicable to any method of feeding oxychlorination reaction gases to a fluidized bed oxychlorination reaction zone and by following the principles enunciated herein, it is now possible for the art to safely proceed with the starting up of an oxychlorination reaction vessel without the hazard of explosion taking place and without the possible quenching of the reaction vessel during the start-up procedure occurring.

In accordance with the present invention, by carefully controlling the sequence of addition of the oxygen, hydrocarbon and chlorinating agent both as to their time of feeding as well as their quantity in relation to each other, a safe start-up of oxychlorination reactions may take place in every instance. Deviations from the procedure outlined herein often results in excessive pressure build-up during start-up, and in some instances explosion, and in other instances, the complete quenching of the reaction system so that it is unable to proceed as desired.

One of the important discoveries made in the instant invention is the fact that in order to proceed with a given oxychlorination reaction system in a fluidized bed oxychlorination reactor, it is necessary to bring the bed temperature up to a temperature at which the particular hydrocarbon being fed to the reaction system will react with the chlorinating agent being fed. The importance of this maintenance of temperature cannot be minimized, since it has been found that where the reaction bed temperature is permitted to fall below this minimum temperature, the reaction is quenched and quickly dies. Thus, even when the temperature of the catalyst bed utilized in the fluidized bed system for oxychlorinating a given material is maintained at the proper temperature for reaction of the particular hydrocarbon and/or hydrocarbon chloride being fed, the reaction itself will die if this temperature is not maintained during the initial phase of the start-up operation. Heat losses occur in the system by dissipation of heat through the walls of the reaction vessels and will result in a substantial drop in the bed temperature to the extent that the reaction will no longer take place.

Thus, in accordance with the teachings of the present invention, the heating media and the bed temperature are raised to a temperature at which the particular hydrocarbon and/or hydrocarbon chloride being fed to the reaction vessel will react and are maintained at that minimum reaction temperature until actual reaction of the mixed feeds has occurred.

The bed is fluidized with air to provide a sufficient gas velocity to the bed of catalyst particles to maintain them in an expanded or fluidized condition. While air is preferred as the fluidizing gas during the initial phase of the start-up procedure, it is, of course, not necessary that air be employed. Thus, if desired, an inert gas such as nitrogen, argon, carbon dioxide and the like may be employed either alone or in admixture with air as the fluidizing gas. For convenience, the invention will be discussed with reference to the use of air during the initial phase of start-up, it being understood that an inert gas or a mixture of such gas and air may be employed in lieu of air alone.

After the bed has been brought to reaction temperature, and the heat transfer media associated with the bed is also at this temperature, usually 10 to 15° F. higher so that it will act as a heat supplier to the bed in case of heat loss, the heating systems associated with the feed gases to be utilized in the oxychlorination reaction which is to take place are activated and the vaporization systems, condensing systems, and like associated equipment are activated. The air flow is then reduced to approximately one-half its original feed rate and the chlorinating agent is admitted to the system in a quantity representing one-half of what would normally be employed during the oxychlorination reaction. Once the chlorinating agent and air have had an opportunity to thoroughly mix in the fluidized bed and are coming off as a mixture in the reactor off gases, the air flow is again reduced to within one-fourth of what initially was fed and the hydrocarbon and/or chlorinated hydrocarbon is now admitted to the reaction zone in a quantity sufficient to maintain fluidization. At this point in the reaction system, the oxygen in the total feed calculates approximately 10 mole percent of the total feed. The bed temperatures are now raised to the optimum temperature for the given reaction and the air feed is cut out altogether and substituted with an oxygen feed slightly below that stoichiometrically necessary for optimum reaction to take place. At this point, the cooling media which has been utilized up to this point as a heating media may have its auxiliary heating equipment shut off. When the temperature of the bed has reached its optimum value, the oxygen is then increased to the molar ratio necessary for stoichiometric operation of the reaction taking place in the reaction bed and the reactor will now be operating satisfactorily under atmospheric pressure conditions.

If it is desired to operate the system under pressure, once equilibrium has been established in the reaction vessel, pressure may be increased in the reactor by increasing in a conventional manner, that is, for example, pinching back on the exit gas stream. It is an important consideration in applying pressure conditions to a reaction vessel of this type that the reactor vessel pressure be applied in small increments. In applying pressure, it is advisable to apply a 1 p.s.i. of pressure by lowering the heat exchange media temperature 10 to 25° F., increasing the rate of pressure and permitting the reactor to achieve a steady state at this increased pressure. Once the reaction has achieved steady state conditions and the temperature has remained constant within the desired temperature range, a second pressure increase may be applied and so forth until a desired reaction pressure has been obtained. Similarly, in reducing pressure it is advisable to reduce the pressure in increments of 1 p.s.i.g. until atmospheric pressure is reached. During this operation, it is important that the heat exchange media temperature be increased during the reduction to maintain it above the desired heat transfer temperature. In both instances, adjustments in feed rates are made to compensate for the changes in pressure made using the atmospheric feed rates as the norm for such changes.

Thus, for a given atmospheric feed, a calculation can be made for a given pressure increase to provide a feed rate change sufficient to supply feed gases to the bed at the same velocities as they were fed under atmospheric conditions.

In the operation of all oxychlorination reaction vessels, procedures must be established for the safe shut-down of reactors should an excess pressure build-up in the reaction vessel occur. This is easily accomplished in accordance with the present invention by shutting down first the oxygen, then the organic feed and last the chlorinating agent. In all instances it is not only desirable but extremely important that an air or inert gas line be kept on the fluidized bed catalytic particles at all times so that during shut-down periods, air or inert gas may be fed to the reaction vessel in sufficient rates to maintain fluidization. In the absence of such a provision, the fluidized bed particles at these excessive temperatures will become fused into a solid mass rendering the start-up of the reaction vessel impossible or extremely difficult due to the fusion of the catalytic particles when they are suddenly deprived of the gas media which maintains them in motion during fluidization.

Thus, in accordance with the instant invention, during a shut-down procedure, air or another inert gas should be supplied to the fluidized bed reaction system when the oxygen is cut out during an emergency, followed by the discontinuance of the hydrocarbon and/or hydrocarbon chloride feed and the chlorinating agent feed in that order. During a shut-down procedure when the oxygen is cut off, air or inert gas is fed into the bed, then the hydrocarbon and/or hydrocarbon chloride feed and the chlorinating agent are shut down in that order. During these shut downs, a volume-for-volume replacement by air or inert gas is the desired procedure to establish so that the fluidization of the bed particles is never lost.

In applying the principles of the instant invention to the accompanying drawing, for convenience, the invention is described with reference to the oxychlorination of 1,2-dichloroethane with elemental chlorine and oxygen for the production of perchloroethylene and trichloroethylene. In accordance with this invention, a mixture of chlorine and 1,2-dichloroethane are fed via gas line 1 to fluidized bed reactor 2. The gases pass into the windbox area 3 of the reaction vessel 2 and rise through the orifices 5 to the fluidized bed particles 6 contained within the vessel 2. Reaction products are removed from the overhead through vent 7. Oxygen is fed to the system through line 8 and passes up through the fluidized bed particles through pipes 10 and 11 and out into the bed itself through ring 12. In starting up a reactor of this type, the catalyst particles are brought to the desired minimum temperature for the reaction of 1,2-dichloroethane, elemental chlorine and oxygen, that is, a temperature of 600° F. by transfer of heat through a suitable jacket (not shown) containing a heat exchange media and surrounding the reactor. This jacket is a conventional metal shell which surrounds the reactor and has associated therewith heating equipment so that the jacket can be utilized both to remove heat and to supply heat. During the first part of the start-up procedure practiced in accordance with this invention, the jacket is utilized to supply heat to the fluidized bed particles. During the start-up procedure of a system of this character, air is fed through line 8 and through line 1. The quantity of air in line 1 being approximately 2.55 moles per hour and the quantity of air through the oxygen ring being 0.9 mole per hour. When fluidization has been established at a velocity of approximately 0.6 foot per second and the 600° F. temperature is being maintained constantly throughout the fluidized bed of catalyst particles, super heaters, vaporizers and condensers are actuated in order to heat the gases before they are fed to the reaction vessel and to prepare for collection of reaction products produced during reaction. The air flow into the windbox through line 1 is now reduced to 1.9 moles per hour and chlorine is added to the windbox mixed with the air being fed thereto through line 1, or if desired, may be admitted separately through the other inlet shown in phantom and labeled 1'. The quantity of chlorine added at this point is 0.64 mole per hour. The air flow is now reduced in the windbox once the chlorine has been fed to the windbox in sufficient quantity to provide for the complete mixing of the chlorine and the air. Once the mixed gases are constant in composition, the air flow through the windbox is again reduced to 0.64 mole per hour. At this point, 1,2-dichloroethane is added to the windbox through line 1 or through line 1' with the chlorine at a rate of 1 mole per hour. At this point, the oxygen in the total feed is approximately 10 mole percent. It should not be greater than this.

The reaction at this point commences and an increase in the temperature of the bed from the 600° F. temperature should be observed. When the bed temperature has reached 670° to 700° F., the air addition through the ring member is cut out completely and 0.7 mole of oxygen is now added through the ring. When the bed temperature increases beyond 700° F., the heating elements associated with the heat transfer media are shut off.

When the temperature has reached the 770° to 800° F. bed temperature, the oxygen content added to the bed through the ring member is increased to 0.92 mole per hour. The windbox air at the same time is cut to 0.21 mole per hour. The heat transfer media at this point should approximate 600° to 630° F. The reactor is lined out at 810° to 825° F. and the system is now in safe operation.

Figure 2:
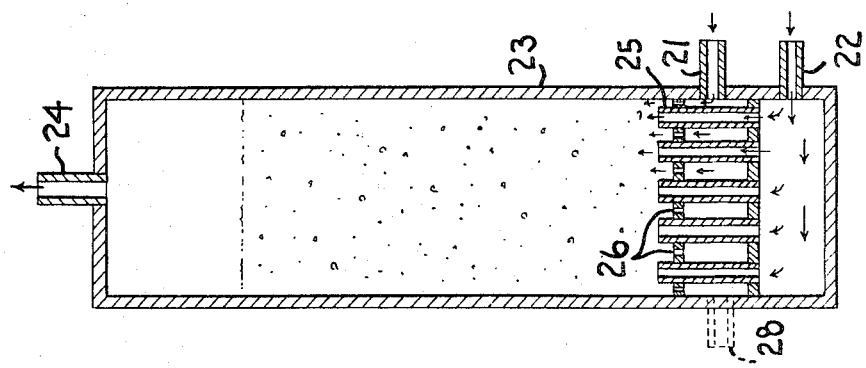
FIGS. 1 and 2 represent fluidized bed oxychlorination reaction vessels in which the invention of the British patent above referred to may be practiced.
Figure 1:
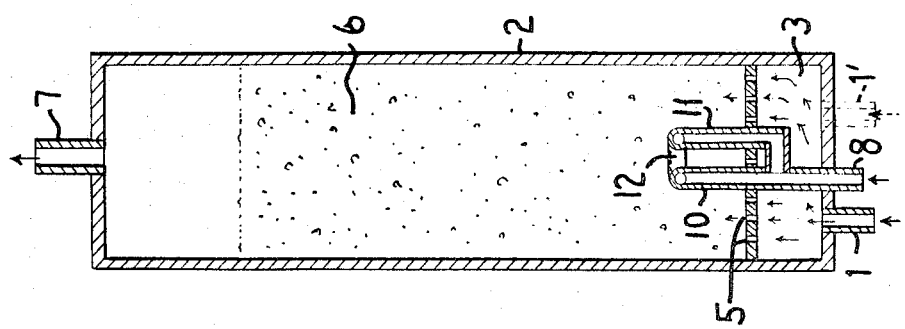

Applying the same principle to the configuration shown in FIG. 2, air is added to the reaction zone system through lines 21 and 22 in reaction vessel 23. Sufficient air as in the case of FIG. 1 is added to fluidize the catalyst bed particles. At the same time, heat is supplied through the heat exchange media associated with the bed in the jackets surrounding the bed, but not shown in the drawing, to provide a bed temperature of 600° F. in the case of the oxychlorination of 1,2-dichloroethane with chlorine and oxygen to produce perchloroethylene and trichloroethylene. Reaction products are removed through exit line 24. The procedure followed in this instance is identical with the procedure followed with respect to FIG. 1, since the tubular units 25 contained within the bed act as the oxygen ring and the balance of the materials are fed to the bed through orifices 26. If desired, when the chlorine is added to the system during the start-up procedure, it may be added through inlet 28 shown in phantom on the drawing, or it may be introduced together with the air in line 22. Similarly, the hydrocarbon and/or hydrocarbon chloride feed, in this instance the 1,2-dichloroethane, may be fed alone through inlet 28 or may be fed in admixture with the chlorine and the air being fed through line 22.

With respect to FIG. 3, the same start-up procedure is followed as in FIG. 1 but with some slight modifications since all gases will be fed to the reaction vessel through the perforations 38 in plate 37 of reaction vessel 35. Thus, in applying the principles of the instant invention to the oxychlorination of 1,2-dichloroethane in the system shown in FIG. 3, air is fed through line 31 to the reaction vessel 35 in sufficient quantities to fluidize the bed. In the case of 1,2-dichloroethane, 3.45 moles per hour of air are fed through line 31 at a velocity of approximately 0.62 foot per second and a jacket associated with the fluidized bed is actuated to provide a temperature in the jacket of 610° to 620° F. and a temperature in the bed of 600° F. When the temperature of the bed has reached the 600° F. level and is steady, the vaporizing system, super heaters and condensers are actuated. The air feed is now reduced to 2.5 moles per hour through gas inlet 31 and chlorine is added through line 32 in quantities representing 0.64 mole per hour. When the gases sufficiently mix in the fluidized bed to provide a constant gas mixture with a constant chlorine content in the overhead of the fluidized bed, the air flow to the windbox through line 31 is again reduced to 1.56 moles per hour. At this point, 1 mole of EDC is fed through line 32 in admixture with the chlorine. If desired, the 1,2-dichloroethane may be fed through line 33, shown in phantom on the drawing, but preferably it is fed as a mixture through lie 32 with $Cl_2$. The bed temperature should now rise due to the exotherm of the oxychlorination reaction taking place within the fluidized bed. when the bed temperature reaches 670 to 700° F., the air being fed through line 31 is cut approximately 1 mole so that 0.56 mole of air is now being fed through line 31. At the same time, oxygen is admitted through line 31 at a rate of 0.7 mole per hour. When the bed temperature passes the 700° F. mark, the heating elements associated with the heat transfer media are shut off. At 750 to 800° F,. the oxygen is increased 0.92 mole per hour and the air feed to the windbox through line 31 is now reduced to 0.21 mole per hour. The reactor is now operating at atmospheric conditions, and the heat transfer media should be approximately 600 to 630° F.

In all instances above described, should pressure operation be desired, a simple method of applying the pressure involves the lowering of the heat transfer media by approximately 15° F. (increase the rate of feed) and the raising of the pressure of the vessel 1 p.s.i.g. The bed temperatures are then lined out after each increase in pressure to the 800 to 840° F. desired bed temperature and once lined out the pressure is then increased again in an increment of 1 p.s.i.g.

In all instances where emergency shut-down must take place due to a substantial increase in reaction pressure or a sudden rise in the reaction temperature, the oxygen feed is first cut to the reactor. Air feed to the reactor is maintained and increased by the volume of oxygen cut when the oxygen is shut off. The organic is then shut off and the air again increased in a quantity representing the quantity of organic being shut off. Finally, the chlorinating agent is shut off and the air again increased to substitute for the volume of chlorinating agent lost. It is important that this procedure be adopted so that the fluidized bed condition is not lost during this shut-down period and the reactor is permitted to cool before any complete shut-down of the fluidized bed takes place.

The particular temperature of the fluidized bed reaction system may be varied according to the practice and teachings of the present invention and depends upon the particular hydrocarbon and/or chlorohydrocarbon fed thereto, as well as the desired product. Generally, reaction temperatures may range between 400 to 1100° F. Most oxychlorination reactions, however, take place conveniently at a temperature range of approximately 450 to about 900° F.

Contact time, that is, the residence time of the feed materials in the reactor, is considerably variable during such reactions. Thus, contact times of 1 to 35 seconds or longer may be employed. Generally, the contact times provide a residence time in the bed for the reactant of between 4 to 20 seconds.

The catalysts employed may conveniently comprise any well known oxychlorination or Deacon type catalyst impregnated on a suitable carrier or support. Catalysts of this type are generally metal halides, preferably chlorides of a multivalent metal such as copper, iron, chromium, and the like. These metal halides usually as chlorides may be utilized alone or may be combined with other metal halides such as alkali metal halide chlorides and alkaline earth metal halide chlorides, typically as chloride or mixtures thereof. Generally speaking, any effective Deacon type metal halide catalyst will produce chlorinated hydrocarbons from the reactants being fed to an oxychlorination reaction zone. A particularly effective catalyst for this reaction is a copper chloride-potassium chloride catalyst impregnated on a Florex carrier. Florex is a calcined fuller's earth manufactured by the Floridin Corporation.

While Florex forms the preferred embodiment as far as support materials are concerned, any suitable support material such as silica, alumina, kieselguhr, diatomaceous earth and the like may be employed.

Generally speaking, these catalyst particles range in size from 25 to 300 mesh. It has been found in accordance with this invention that a particularly effective mesh size for catalyst particles in conducting these reactions is a 30 to 100 mesh catalyst particle, preferably a 30 to 60 mesh size. (U.S. Sieve Series.)

To place the catalyst material on the carrier support recourse to simple immersion techniques, that is, where the carrier is immersed in solutions containing the catalytic components, may be had. If desired, the catalytic material may be sprayed on the particles in mixing devices and the solution evaporated therefrom or the catalytic solutions may be dropped in fluidized beds of catalyst particles in order to impart their catalytic content to the carrier support.

As previously stated, the fluidized bed operations conducted in accordance with this invention may be conducted under atmospheric conditions of pressure or if desired may be conducted under conditions of considerable pressure. Thus, if desired, pressure may be applied to the oxychlorination reaction conducted to thereby give rise to increased productivity. Reaction products are collected from the upper portion of the fluidized beds and removed from the reaction zone. Usually, the upward flow of gases sweeps out the reaction products along with any unreacted and inert constituents. The reaction products from these operations are comprised of various chlorinated organic derivatives of the hydrocarbon and/or chlorohydrocarbon fed to the reaction zone and are conventionally condensed and after absorption, purification, water removal steps, etc. in accordance with conventional practices in the art are separated one from the other by recourse to distillation techniques, selective absorption and other like separation procedures.

The present invention is applicable to the oxychlorination of aliphatic hydrocarbons containing from 1 to 4 carbon atoms and their incompletely chlorinated derivatives. Typical of the organic materials encountered as feed in these systems are methane, methyl chloride, ethane, ethyl chloride, 1,2-dichloroethane, 1,1-dichloroethane 1,1,2-trichloroethane ethylene propane propyl chloride, propene, butane and chlorinated derivatives of butane.

In conducting the start-up procedure of the instant invention with respect to any of these compounds other than the 1,2-dichloroethane specifically described with reference to the drawing, it is an important consideration that the materials fed are fed in the sequence stated. While the temperature will vary considerably depending upon the feed in order to provide a given product, the applicability of the process to start-up of other materials is not destroyed. Thus, for example, in the case of ethylene where reaction temperatures are extremely low, the bed temperature should be approximately 400° F. prior to the feeding of the chlorinating agent to the bed. Thus, the bed temperature would be maintained in this instance at 400° F. and the bed fluidized with air until steady heat conditions prevail throughout the bed and the heat exchange media associated therewith. At this point, the chlorinating agent is then fed to the reaction system while a reduction in the flow of air is accomplished. With respect to the addition of oxygen to the bed, it is, of course, understood that where 1,2-dichloroethane is the desired reaction product and ethylene is the feed, the addition of oxygen to the bed is withheld until the bed temperature rises at least 50° F. after the addition of the hydrocarbon during the start-up procedure. In general, a convenient yardstick for measuring the point at which the oxygen is added to the system is a rise in temperature after the addition of the hydrocarbon and/or hydrocarbon chloride to the reaction system of 50° F. Thus, for any given operation where steady state conditions have been maintained in the bed with respect to a given temperature, after the addition of a hydrocarbon and/or hydrocarbon chloride, a temperature rise of 50° F. signals the point at which oxygen should now be added to the system and air reduced again. The particular point at which the air is cut out almost entirely and the oxygen is fed at, or close to (90 percent of stoichiometry), optimum values will depend upon the particular hydrocarbon chloride desired from the starting material. In the case of ethylene for the manufacture of ethylene dichloride, this temperature is conveniently reached at 540° F. In the case of ethane for the production of vinyl chloride, this temperature is reached conveniently at a temperature of 932° F. In the case of methane for the production of carbon tetrachloride, the temperature is conveniently reached at 840° F. In all instances, however, the temperature increments must be watched carefully so that no substantial rise in temperature is permitted to take place without an adjustment being made in the feed gas system.

The catalyst beds are fluidized by following conventional procedures in the art. The velocity of the gases fed to the bed of particles will depend upon the density of the bed particles, their size and other similar considerations. In general, superficial linear velocities of 0.5 to 2 feet per second are employed but this velocity range may vary up or down depending upon bed conditions as above indicated. The important consideration is to provide sufficient gas volume and velocity to cause the bed particles to be maintained in motion and the bed to be in an expanded condition over its condition prior to the admission of gas thereto. During fluidization, the catalyst bed typically expands in volume, the extent of expansion depending upon the velocity of the gases fed to the beds.

While the invention has been described with reference to certain specific procedures and illustrated embodiments, it is, of course, to be understood that the invention is not intended to be limited thereby, except insofar as appears in the accompanying claims.

What is claimed is:

1. A method of initiating an oxychlorination reaction in which a material to be chlorinated selected from the group consisting of acyclic aliphatic hydrocarbons containing 1 to 4 carbon atoms and their incompletely chlorinated derivatives is reacted in the vapor phase with oxygen and a chlorinating agent selected from the group consisting of HCl, $Cl_2$ and mixtures of HCl and $Cl_2$ in a fluidized bed of oxychlorination catalyst comprising the steps of fluidizing said bed with a fluidizing gas selected from the group consisting of air, inert gas, and mixtures thereof while maintaining a temperature therein sufficient to cause said material to be chlorinated to react with said chlorinating agent, when said bed is at this temperature adding to said bed said chlorinating agent while reducing the quantity of said fluidizing gas fed thereto to establish a mixture of said fluidizing gas and chlorinating agent in said bed, reducing the quantity of said fluidizing gas while supplying a quantity of material to be chlorinated to said bed sufficient to maintain fluidization, feeding oxygen to the bed and further reducing said fluidizing gas feed thereto when the temperature has increased after the addition of said material to be chlorinated and adjusting all feeds to the desired stoichiometry of the desired oxychlorination reaction.

2. A method of initiating an oxychlorination reaction in which a material to be chlorinated is selected from the group consisting of acyclic aliphatic hydrocarbons containing 1 to 4 carbon atoms and their incompletely chlorinated derivatives is reacted in the vapor phase with oxygen and a chlorinating agent selected from the group consisting of HCl, $Cl_2$ and mixtures of HCl and $Cl_2$ in a fluidized bed of oxychlorination catalyst comprising the steps of fluidizing said bed with a fluidizing gas selected from the group consisting of air, inert gas, and mixtures thereof while supplying heat to said bed to maintain the temperature therein sufficient to cause said material to be chlorinated to react with said chlorinating agent, when said bed is at this temperature, adding to said bed said chlorinating agent while reducing the quantity of said fluidizing gas fed thereto to establish a mixture of said fluidizing gas and chlorinating agent in said bed, reducing the quantity of fluidizing gas when said mixture is constant while supplying a quantity of material to be chlorinated to said bed at least equal to the quantity of said fluidizing gas reduced in this step, feeding oxygen to the bed and further reducing said fluidizing gas feed thereto when the temperature has increased after the addition of said material to be chlorinated, discontinuing the heating of said bed and adjusting all feeds to the desired stoichiometry of the desired oxychlorination reaction.

3. The method of claim 2 wherein the temperature of said bed has increased at least 50° F. before feeding said oxygen to said bed and before further reducing said fluidizing gas feed thereto.

4. The method of claim 2 wherein said fluidizing gas is air.

5. The method of claim 2 wherein said fluidizing gas is an inert gas.

6. The method of claim 2 wherein said fluidizing gas is air, the material to be chlorinated is 1,2-dichloroethane, said chlorinating agent is elemental chlorine and said bed is heated to 600° F. when said bed is fluidized with air.

7. The method of claim 2 wherein the material to be chlorinated is ethylene, said fluidizing gas is air, and said bed is heated during fluidization with air to a temperature of about 400° F.

References Cited

UNITED STATES PATENTS

| | | | |
|---|---|---|---|
| 2,966,525 | 12/1960 | Steen | 260—659A |
| 3,215,508 | 11/1965 | Piester | 260—659A |

HOWARD T. MARS, Primary Examiner

U.S. Cl. X.R.

260—656, 659, 662